US008830508B2

(12) United States Patent
Mori (10) Patent No.: US 8,830,508 B2
(45) Date of Patent: Sep. 9, 2014

(54) RELAY DEVICE, NETWORK SYSTEM, AND METHOD OF CONTROLLING RELAY DEVICE

(75) Inventor: Ryuta Mori, Yokohama (JP)

(73) Assignee: Canon Kabushiki Kaisha (JP)

( * ) Notice: Subject to any disclaimer, the term of this patent is extended or adjusted under 35 U.S.C. 154(b) by 174 days.

(21) Appl. No.: 13/474,821

(22) Filed: May 18, 2012

(65) Prior Publication Data

US 2012/0293837 A1 Nov. 22, 2012

(30) Foreign Application Priority Data

May 19, 2011 (JP) ................................ 2011-112448

(51) Int. Cl.
*G06K 15/02* (2006.01)
(52) U.S. Cl.
USPC ......................................... 358/1.15; 358/407
(58) Field of Classification Search
USPC ........... 358/1.1, 1.9, 1.15, 400, 401, 407, 434
See application file for complete search history.

(56) References Cited

U.S. PATENT DOCUMENTS

| 6,421,733 | B1* | 7/2002 | Tso et al. ...................... 709/246 |
| 7,765,248 | B2* | 7/2010 | Kanasaki ...................... 709/203 |
| 2007/0165265 | A1 | 7/2007 | Ito et al. |
| 2007/0263248 | A1* | 11/2007 | Oshima et al. ............... 358/1.15 |
| 2011/0134475 | A1* | 6/2011 | Ooba ............................ 358/1.15 |
| 2012/0084402 | A1* | 4/2012 | Ito et al. ....................... 709/219 |

FOREIGN PATENT DOCUMENTS

JP 2006-203869 A 8/2006

* cited by examiner

*Primary Examiner* — Thomas D Lee
(74) *Attorney, Agent, or Firm* — Rossi, Kimms & McDowell LLP (57) ABSTRACT

A relay device for properly causing an information processing apparatus to process a Web service request from an external apparatus even when a firewall exists between the information processing apparatus and the external apparatus or even when the information processing apparatus exists in an environment in which address translation is performed. A mediation application of a mediation apparatus transmits a request corresponding to an operation on an operation screen displayed on an MFP, to a server, and receives a response to the request from the server. The mediation application determines to which of a Web browser and a service provider section of the MFP according to the content of the response. The mediation application transmits the response to one of the Web browser and the service provider section according to a result of the determination.

19 Claims, 7 Drawing Sheets

RELAY DEVICE, NETWORK SYSTEM, AND METHOD OF CONTROLLING RELAY DEVICE

BACKGROUND OF THE INVENTION

1. Field of the Invention

The present invention relates to a relay device, a network system, and a method of controlling the relay device, and more particularly to a relay device that mediates communication between an information processing apparatus that displays an operation screen provided from an external apparatus, and performs processing corresponding to an operation on the operation screen and the external apparatus, and a method of controlling the relay device.

2. Description of the Related Art

Conventionally, an image processing apparatus is generally known which accommodates component parts having respective functions of a scanner, a printer, a facsimile machine, a network transmission device, and so forth, within a single casing. Further, it is also popular to use a Web browser in a console section of such an image processing apparatus. Japanese Patent Laid-Open Publication No. 2006-203869 discloses a form of use of the above-mentioned functions on an operation screen displayed by a Web browser.

According to Japanese Patent Laid-Open Publication No. 2006-203869, the Web browser installed in an image forming apparatus displays an operation screen concerning image processing functions based on screen information (screen data) received from an external apparatus on a network. Then, upon receipt of a user's operation using the operation screen, the web browser transmits information on the operation received from the user to the external apparatus. Thereafter, the image forming apparatus receives a Web service request based on the user's operation from the external apparatus. The image forming apparatus executes the scan function or the print function of the image forming apparatus in response to the Web service request.

However, a firewall sometimes exists between an information processing apparatus provided with a Web browser and an external apparatus on a network. In general, the firewall allows connection from the inside to the outside, but does not allow connection from the outside to the inside. For this reason, the above-mentioned method of the Japanese Patent Laid-Open Publication No. 2006-203869 is sometimes incapable of receiving a Web service request from an external apparatus.

Further, when an MFP (multi-function peripheral) exists in an environment in which addresses are used while translating between public and private addresses by a network address translator (NAT), it sometimes occurs that an MFP requesting a Web service cannot be identified by an external apparatus on the network.

SUMMARY OF THE INVENTION

The present invention provides a relay device and a network system for causing an information processing apparatus to properly process a Web service request from an external apparatus even when a firewall exists between the information processing apparatus and the external apparatus or even when the information processing apparatus exists in an environment in which address translation is performed, and a method of controlling the relay device.

In a first aspect of the present invention, there is provided a relay device that communicates with an external apparatus via a network, and mediates between an information processing apparatus which executes job processing according to an operation on an operation screen provided by the external apparatus and the external apparatus, the information processing apparatus including a display control unit configured to display the operation screen on a display section, and a job processing unit configured to execute the job processing, the relay device comprising a transmission and reception unit configured to receive a request corresponding to an operation on the operation screen from the information processing apparatus, transmit the received request to the external apparatus, and receive a response to the request from the external apparatus, a determination unit configured to determine to which of the display control unit and the job processing unit the response is to be transmitted according to a content of the response, and a transmission unit configured to transmit the response to one of the display control unit and the job processing unit according to a result of the determination by the determination unit.

In a second aspect of the present invention, there is provided a network system including a relay device that communicates with an external apparatus via a network, and an information processing apparatus that communicates with the relay device, wherein the information processing apparatus comprises a display control unit configured to display an operation screen on a display section, and a job processing unit configured to execute job processing, and wherein the relay device comprises a transmission and reception unit configured to receive a request corresponding to an operation on the operation screen from the information processing apparatus, transmit the received request to the external apparatus, and receive a response to the request from the external apparatus, a determination unit configured to determine to which of the display control unit and the job processing unit the response is to be transmitted according to a content of the response, and a transmission unit configured to transmit the response to one of the display control unit and the job processing unit according to a result of the determination by the determination unit.

In a third aspect of the present invention, there is a method of controlling a relay device that communicates with an external apparatus via a network, and mediates between an information processing apparatus which executes job processing according to an operation on an operation screen provided by the external apparatus and the external apparatus, the information processing apparatus including a display control unit configured to display the operation screen on a display section, and a job processing unit configured to execute the job processing, the method comprising receiving a request corresponding to an operation on the operation screen from the information processing apparatus, transmitting the received request to the external apparatus, and receiving a response to the request from the external apparatus, determining to which of the display control unit and the job processing unit the response is to be transmitted according to a content of the response, and transmitting the response to one of the display control unit and the job processing unit according to a result of the determination by the determining.

According to the present invention, even when a firewall exists between the information processing apparatus and the external apparatus on a network, or even when the information processing apparatus exists in an environment in which address translation is performed, it is possible to properly process a Web service request sent from the external apparatus based on a user's operation on the web browser.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
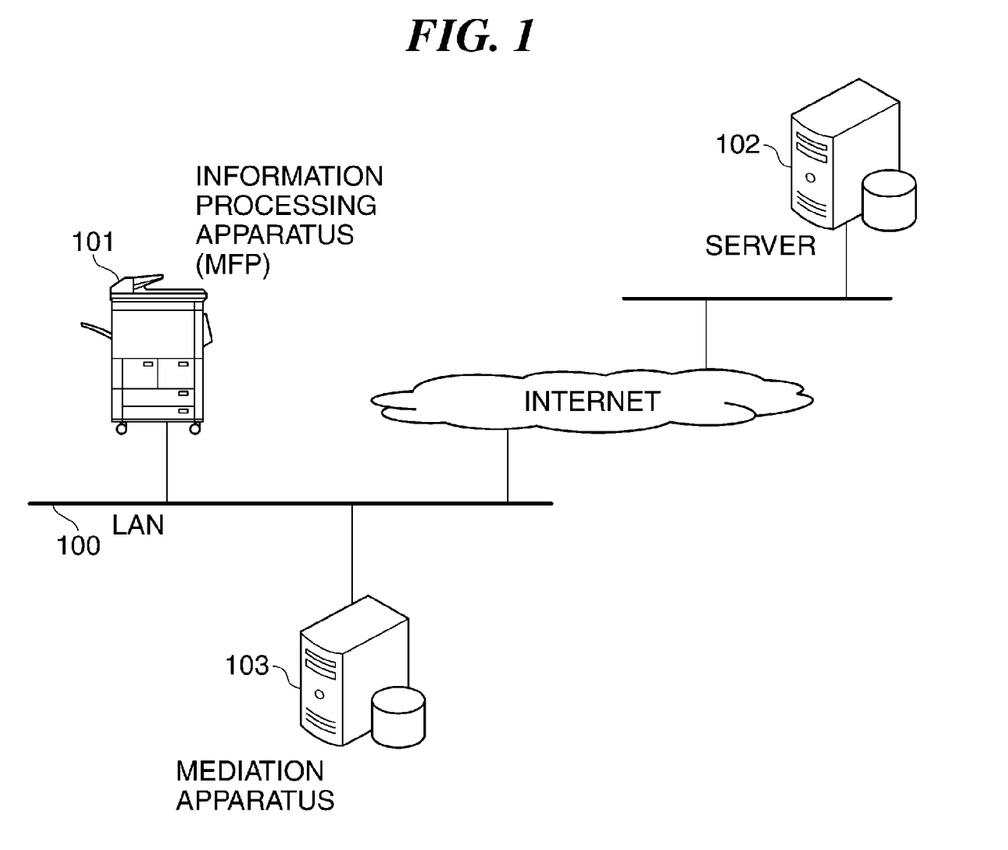
FIG. 1 is a diagram of a network system including a relay device (mediation apparatus) according to an embodiment of the present invention and an information processing apparatus.

FIG. 1 is a view showing an example of a network system including a relay device according to an embodiment of the present invention, and an information processing apparatus. In the illustrated example, the information processing apparatus, denoted by reference numeral 101, and the relay device (hereinafter also referred to as the mediation apparatus or the proxy server), denoted by reference numeral 103, are communicably interconnected via a local area network (LAN) 100. Further, a server (Web server) 102 exists on the Internet.

In the present embodiment, although not shown in FIG. 1, a firewall and a NAT (network address translator) are provided between the Internet and the LAN 100. The firewall has a function of preventing unauthorized accesses to the inside of the LAN 100 from the Internet.

Further, the NAT has an address translation table for translating between a public address and a private address used inside the LAN 100. The address translation using the address translation table enables an apparatus installed within the LAN 100, which has only private address, to transparently access an external apparatus on the Internet.

Hereafter, a description will be given of an MFP (multifunction peripheral) having various image processing functions, such as an image formation (print) function, an image reading function, and an image transmission function, as an example of the information processing apparatus 101.

The MFP 101 has a so-called Web browser function, and the server 102 has a function of delivering Web contents via the network 100. The server 102 sends Web contents in response to a request from the MFP 101. Note that the MFP 101 is provided with a plurality of interfaces for performing communication.

The MFP 101 is configured such that when the MFP 101 transmits a request to the server 102 using the above-mentioned browser function, the request transmission is necessarily mediated by the relay device (mediation apparatus) 103.

For this reason, requests to the server 102 transmitted by the Web browser of the MFP 101 and respective responses to the requests are all necessarily mediated by the relay device (mediation apparatus) 103.

The mediation apparatus 103 mediates communication between the server 102 and the MFP 101. For example, when a request or a response is transmitted from the server 102 to the MFP 101, the mediation apparatus 103 analyzes the content of the request or response, and performs processing for selecting one of the plurality of interfaces provided in the MFP 101 according to a result of the analysis. Further, the mediation apparatus 103 sends a result of processing (job processing result) executed by the MFP 101 to the server 102.

Although in the present embodiment, the description is given assuming that the server (Web server) is an example of an external apparatus, it is to be understood that a general-purpose personal computer may be applied to the external apparatus.

Figure 2:
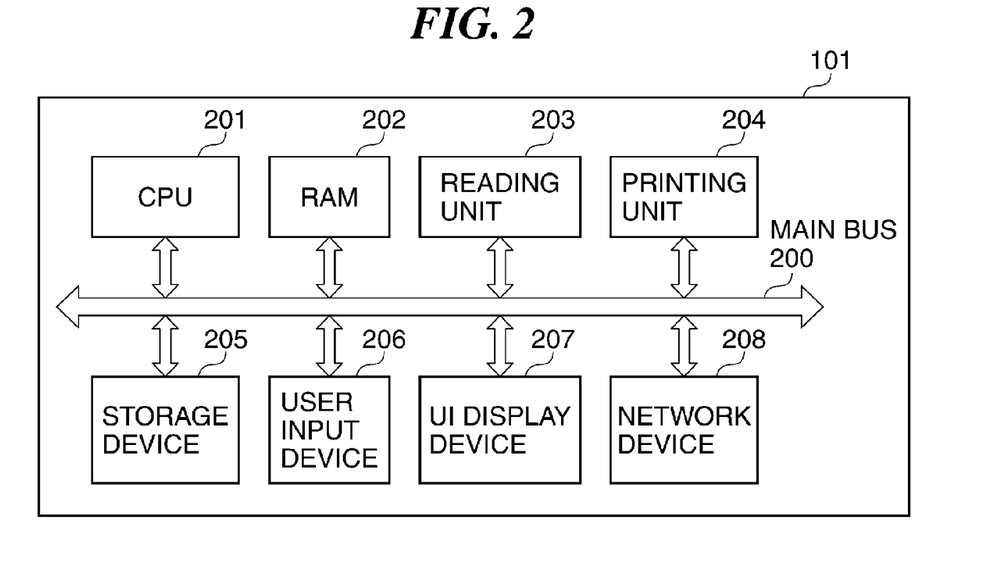
FIG. 2 is a block diagram of the information processing apparatus appearing in FIG. 1.

FIG. 2 is a block diagram of the MFP 101 appearing in FIG. 1.

In FIG. 2, the MFP 101 includes a CPU 201 that controls the overall operation of the MFP 101. The MFP 101 further includes a RAM 202 used as a work area by the CPU 201, a reading unit 203 that reads an image from an original, and a printing unit 204 that performs printing according to image data. The MFP 101 further includes a storage device 205, a user input device 206, a UI (user interface) display device 207, and a network device 208. The CPU 201, the RAM 202, the reading unit 203, the printing unit 204, the storage device 205, the user input device 206, the UI display device 207, and the network device 208 are interconnected via a main bus 200.

The storage device 205 stores programs and various kinds of configuration information, and is implemented e.g. by an HDD or an NVRAM (non-volatile RAM). The user input device 206 is used for inputting a command by a user, and the UI display device 207 displays various kinds of screens thereon. The network device 208 is used for communicating with an external device (e.g. the server 102) via the network 100. In the illustrated example, the CPU 201 controls the RAM 202, the reading unit 203, the printing unit 204, the storage device 205, the user input device 206, the UI display device 207, and the network device 208, via the main bus 200. Further, the UI display device 207 may be implemented by a touch panel display so as to cause the same to play the role of the user input device 206 as well.

Figure 3:
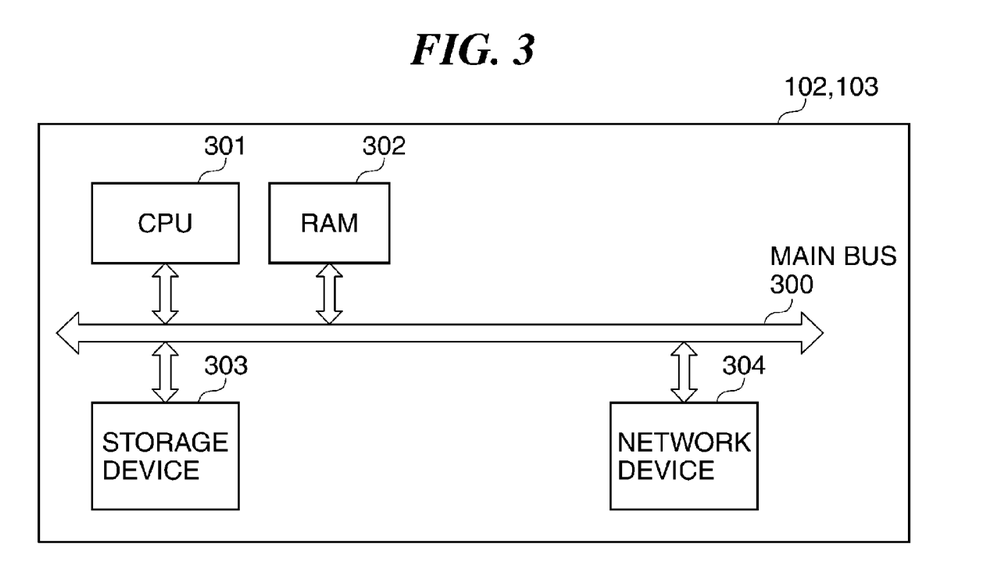
FIG. 3 is a block diagram showing the hardware configuration of each of a server and the mediation apparatus both appearing in FIG. 1.

FIG. 3 is a block diagram showing the hardware configuration of each of the server 102 and the mediation apparatus 103 appearing in FIG. 1.

In FIG. 3, the server 102 includes a CPU 301, a RAM 302, a storage device 303, and a network device 304, which are interconnected via a main bus 300. The RAM 302 is used as a work area for the CPU 301, and the storage device 303 stores programs and various kinds of configuration information. The network device 304 communicates with the MFP 101 via the network 100.

In the illustrated example, the CPU 301 controls the RAM 302, the storage device 303, and the network device 304, via the main bus 300. Note that the mediation apparatus 103 has the same hardware configuration as that of the server 102.

Figure 4:
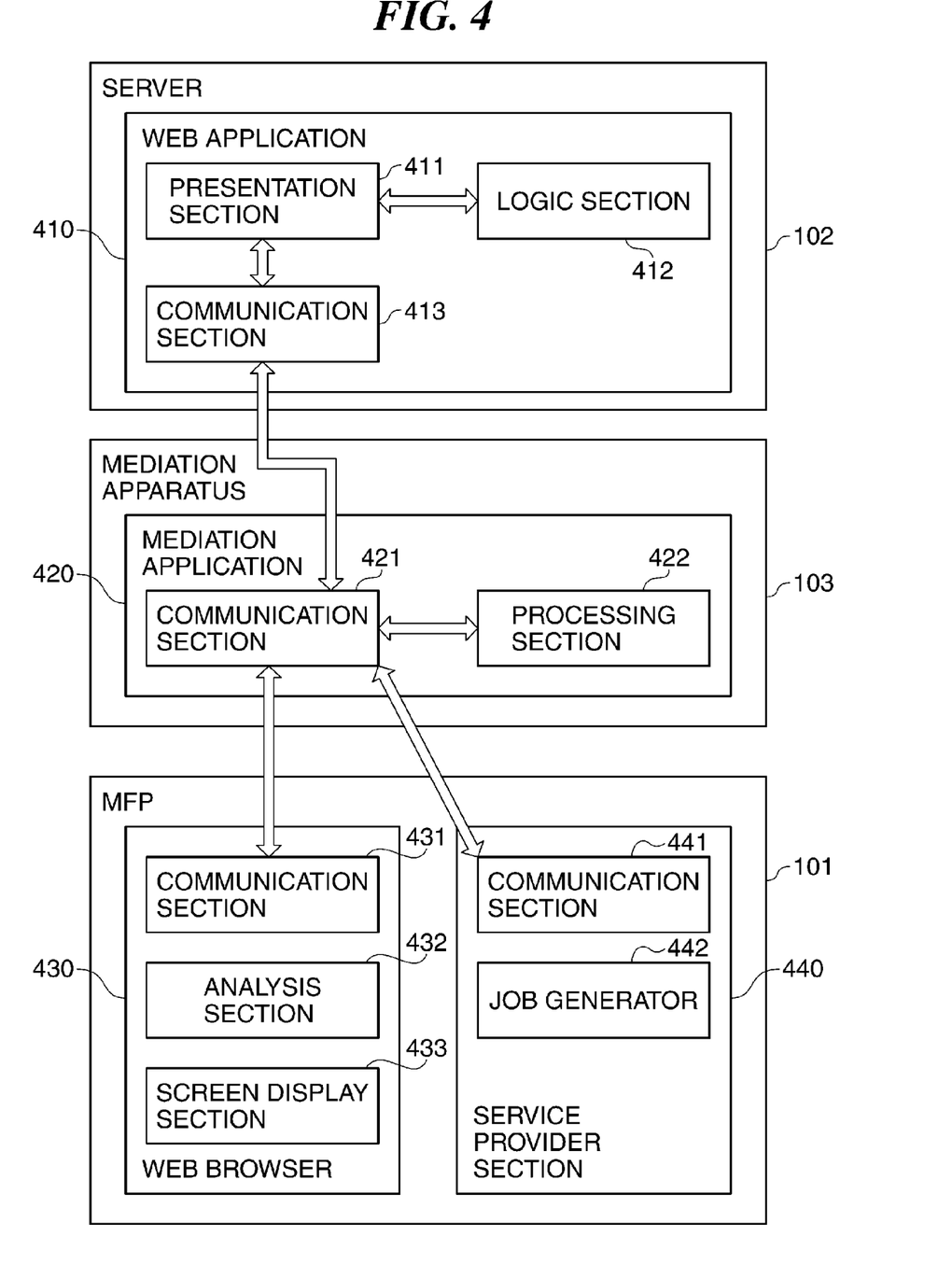
FIG. 4 is a diagram showing the software configuration of the information processing apparatus, the server, and the mediation apparatus, appearing in FIG. 1.

FIG. 4 is a diagram showing the software configuration of the MFP 101, the server 102, and the mediation apparatus 103, appearing in FIG. 1. Software (control programs) shown in FIG. 4 is executed by the CPU 201 of the MFP 101 and the respective CPUs 301 of the server 102 and the mediation apparatus 103.

In FIG. 4, a Web application 410 operates on the server 102. The Web application 410 comprises a presentation section 411, a logic section 412, and a communication section 413.

The presentation section 411 communicates with the mediation apparatus 103 via the communication section 413, and responds to a request from the information processing apparatus (hereinafter also referred to as the MFP) 101, thereby transmitting an operation screen to be displayed on the MFP 101 or a processing request, as a response, to the MFP 101. Further, the presentation section 411 receives information input via the operation screen displayed on the MFP 101, from the MFP 101 via the communication section 413.

The logic section 412 performs processing in response to the above-mentioned input information notified from the presentation section 411. For example, the logic section 412 changes a screen to be displayed according to the input information, and creates a processing request for execution of device functions of the MFP 101.

The communication section 413 is a software module that controls the network device 304 (see FIG. 3) to perform communication using an HTTP protocol.

The mediation apparatus 103 is provided with a mediation application 420. The mediation application 420 includes a communication section 421 and a processing section 422. The communication section 421 receives a request transmitted from the MFP 101. Then, the communication section 421 transfers the request to the presentation section 411 and the logic section 412 via the communication section 413.

Further, upon receipt of a response sent from the Web application 410, the communication section 421 transfers the response to the processing section 422. The processing section 422 analyzes the response, and communicates with the MFP 101 via the communication section 421 according to a result of the analysis, as described hereinafter.

The MFP 101 includes a Web browser 430 and a service provider section 440. The Web browser 430 and the service provider section 440 each are executed by the CPU 201 of the MFP 101. Note that the Web browser 430 is not limited to the one that displays the contents sent from the server 102. Similarly, the server 102 and the mediation apparatus 103 are also not limited to devices for transmitting and receiving requests and responses according to the HTTP protocol. The Web browser 430 is only required to have functions of acquiring contents by communicating with a desired server and displaying the acquired contents on the screen.

In the illustrated example, the Web browser 430 includes a communication section 431, an analysis section 432, and a screen display section 433. The communication section 431 communicates with the server 102 via the communication section 421 (i.e. via the mediation apparatus 103) according to the HTTP protocol. The service provider section 440 includes a communication section 441 and a job generator 442. The communication section 441 communicates with the server 102 via the communication section 421 according to the HTTP protocol.

For example, when the Web browser 430 or the service provider section 440 of the MFP 101 makes a request based on a response from the Web application 410 of the server 102, the communication section 421 of the mediation application 420 receives the request from the communication section 431 of the Web browser 430 or the communication section 441 of the service provider section 440. Then, the communication section 421 of the mediation application 420 notifies the request to the presentation section 411 of the Web application 410 via the communication section 413 of the same.

The communication section 431 transmits information (input information), which is input via the operation screen displayed by the Web browser 430, via the mediation apparatus 103, as a request, to the Web application 410 of the server 102. Then, the communication section 431 receives a response transmitted from the Web application 410 via the mediation apparatus 103.

The analysis section 432 of the Web browser 430 of the MFP 101 analyzes the response received from the Web application 410 of the server 102 via the mediation apparatus 103. The response includes HTML data of a description indicative of contents of the operation screen displayed by the Web browser 430.

The screen display section 433 displays the HTML data provided by the server 102 on a screen on the UI display device 207 (see FIG. 2) as the operation screen according to the result of the analysis by the analysis section 432.

The communication section 441 of the service provider section 440 receives a processing request from the mediation application 420. As an interface used in receiving the processing request, a Web service interface, for example, is used. The job generator 442 receives the processing request received by the communication section 441, and generates a job for executing the requested processing, whereby the job is executed.

Figure 5:
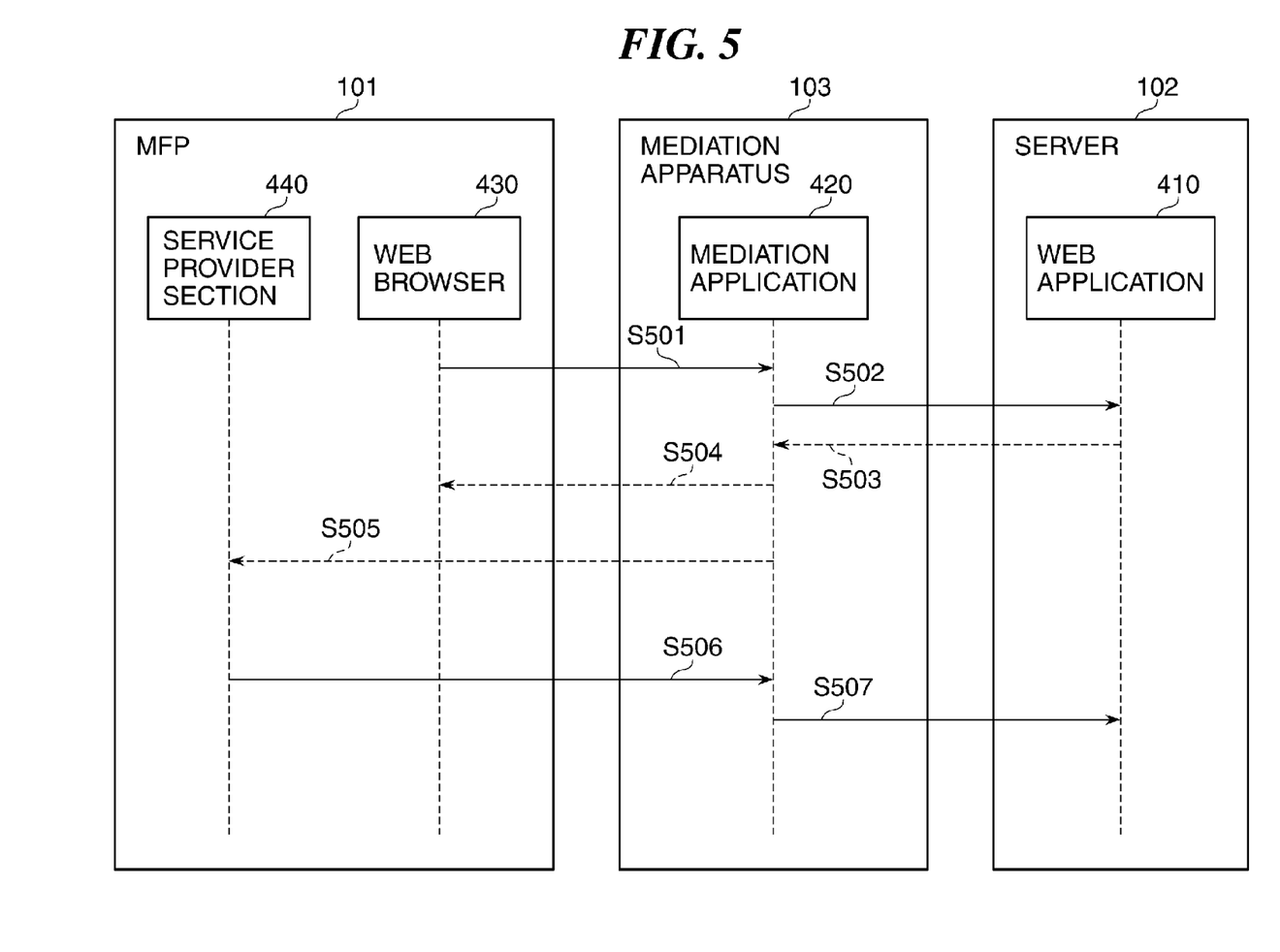
FIG. 5 is a sequence diagram useful in explaining a process executed by the information processing apparatus (MFP), the server, and the mediation apparatus, appearing in FIG. 4.

FIG. 5 is a sequence diagram useful in explaining a process executed by the information processing apparatus (MFP) 101, the server 102, and the mediation apparatus 103, appearing in FIG. 4.

Referring to FIGS. 2 to 5, a description will be given hereafter of an example in which the MFP 101 sends a request, and the mediation apparatus 103 mediates processing associated with the request and transmits the result of the mediation processing to the server 102 as a response.

When a user depresses a hardware button (not shown) for performing transmission from the UI display device 207 of the MFP 101, the Web browser 430 is started.

To acquire a setting screen for performing setting concerning the execution of the job processing, the Web browser 430 sends a request for the setting screen to the Web application 410 of the server 102. In the illustrated example, a URL indicative of the contents of a menu screen (setting screen) has been set in the MFP 101 in advance.

The Web browser 430 sends a request using a GET command of the HTTP to the Web application 410 holding the contents indicated by the URL. More specifically, the communication section 431 of the Web browser 430 communicates with the communication section 421 of the mediation apparatus 103 using HTTP protocol according to the HTML data (URL). Then, the communication section 421 communicates with the communication section 413 of the server 102.

Through this communication, the communication section 413 passes the HTML data to the Web application 410 according to the received URL. As a result, the request has been sent from the Web browser 430 to the Web application 410. Note that in the following description, description of operations (processing) of the communication sections 413, 421, 431, and 441 is omitted.

As described above, when a request is sent from the Web browser 430 to the mediation application 420 (step S501), the mediation application 420 forwards the request received from the Web browser 430 to the Web application 410 (step S502).

The Web application 410 performs processing according to the contents of the request, and sends the result of the processing to the mediation application 420 of the mediation apparatus 103 as a response (step S503). Upon receipt of the response, the mediation application 420 performs determination processing, described hereinafter, to determine whether to send the response to one of the Web browser 430 and the service provider section 440 of the MFP 101.

The mediation application 420 sends the response to one of the Web browser 430 and the service provider section 440 according to the result of the determination processing (steps S504 and S505).

When the Web browser 430 of the MFP 101 receives the response, it displays the processing result indicated by the response on the UI display device 207 (see FIG. 2), and terminates the processing. On the other hand, when the service provider section 440 of the MFP 101 receives the response, it performs processing according to the response, and sends the result of the processing to the mediation application 420 of the mediation apparatus 103 (step S506). Then, the mediation application 420 sends the processing result received from the service provider section 440 to the Web application 410 of the server 102, and terminates the processing.

Figure 6:
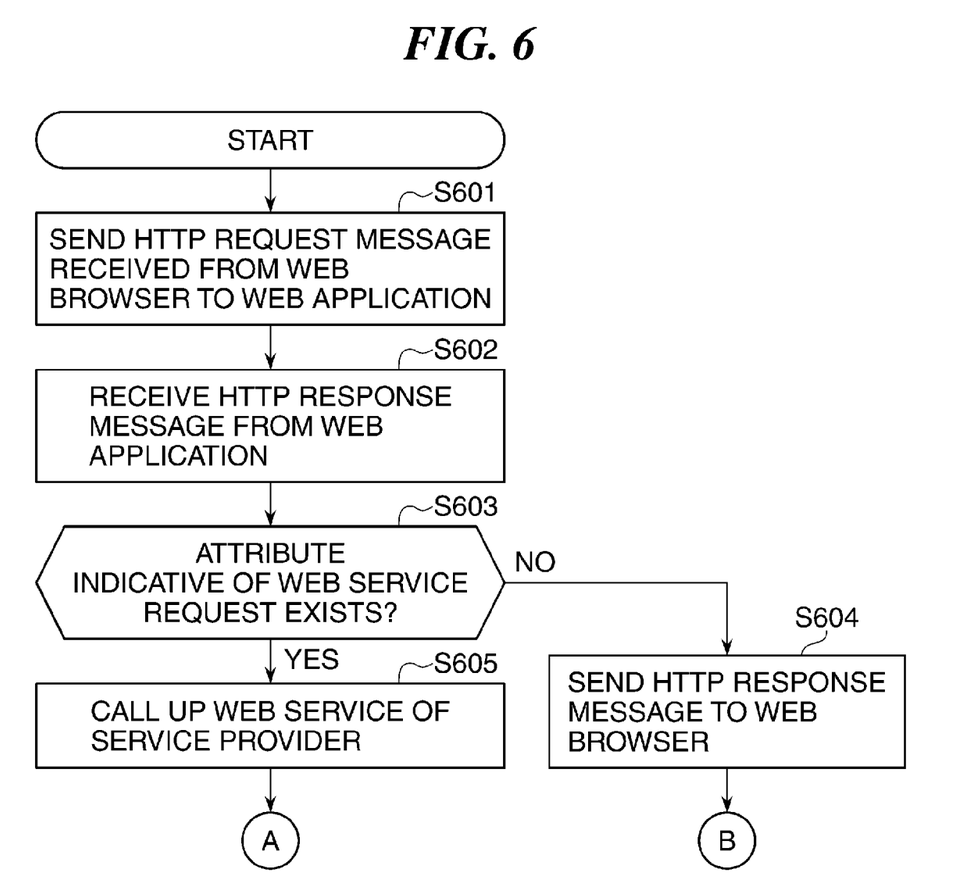
FIG. 6 is a flowchart useful in explaining a process executed by the mediation apparatus.

FIG. 6 is a flowchart useful in explaining a process executed by the mediation application 420 appearing in FIG. 4 for mediating between the MFP 101 (the Web browser 430 and the service provider section 440) and the Web application 410.

In the following description, a message transmitted by the MFP 101 to the server 102 (Web application 410) on the Internet is referred to as a "HTTP request message". Further, a message transmitted by the server 102 (Web application 410) as a response to the HTTP request message is referred to as a "HTTP response message". The Web browser 430 can transmit not only a command for requesting the server 102 to send the contents to be displayed on the operation screen but also commands for causing the Web application 410 to execute various kinds of processing, in a state contained in the HTTP request massage.

On the other hand, the Web application 410 can cause an HTTP response message as a response to the HTTP request message to contain a command for requesting the MFP 101 to perform processing. For example, the Web application 410 transmits e.g. a command for requesting the MFP 101 to perform scan processing or a command for requesting the MFP 101 to transmit a file, in a state contained in an HTTP response message, and causes the MFP 101 to execute a job according to the command contained in the message. With this configuration, even when a firewall exists between the MFP 101 and the server 102, the server 102 can request the MFP 101 to execute processing.

Figure 7:
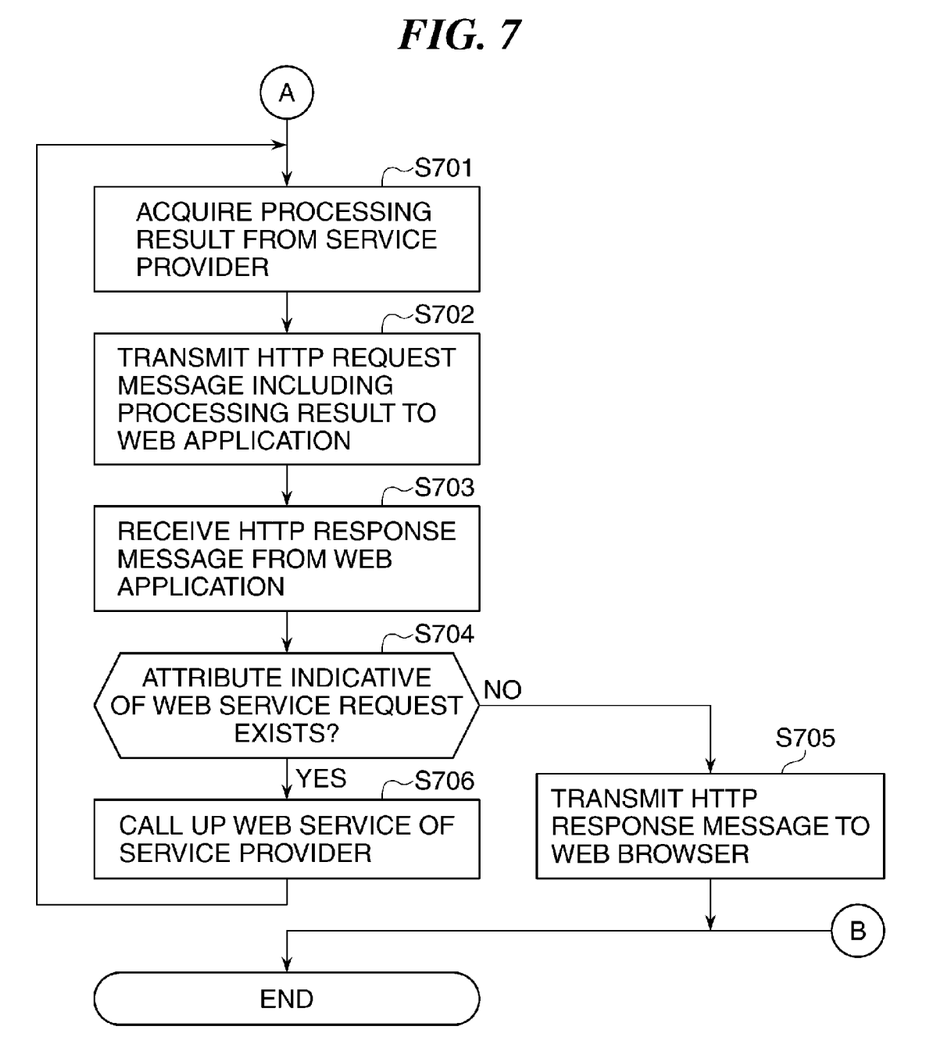
FIG. 7 is a continuation of FIG. 6.

The process in the flowchart in FIGS. 6 and 7 is started upon receipt of an HTTP request message from the Web browser 430 provided in the MFP 101.

Referring to FIGS. 4 and 6, when the mediation application 420 receives an HTTP request message addressed to the Web application 410 from the Web browser 430, the mediation application 420 forwards the HTTP request message to the Web application 410 (step S601). Then, the mediation application 420 receives an HTTP response message from the Web application 410 as a response to the HTTP request message (step S602).

Figure 9:
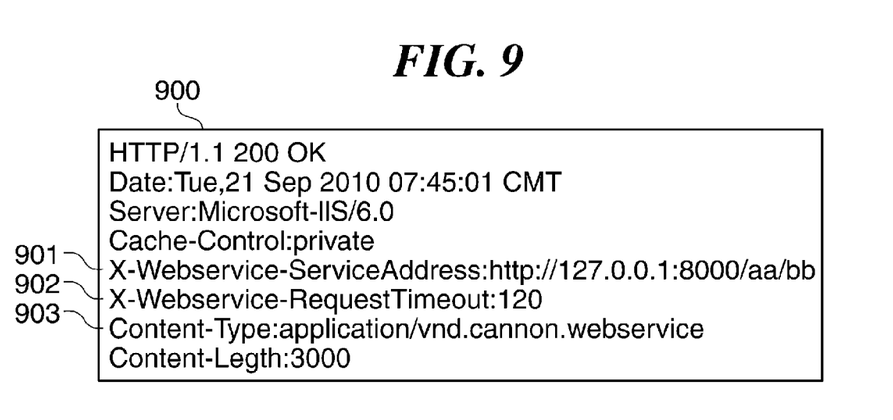
FIG. 9 is a view of a header of an HTTP response transmitted by a Web application to a mediation application appearing in FIG. 4.

Here, a description will be given of a header of the HTTP response message (HTTP response header) transmitted by the Web application 410 to the mediation application 420 with reference to FIG. 9. FIG. 9 is a view of the header of the HTTP response message transmitted by the Web application 410 to the mediation application 420.

As shown in FIG. 9, the header, denoted by reference numeral 900, of the HTTP response message includes a destination 901 (X-Web Service-Address), a time-out period 902 (X-Web service-Request Time out), and a content type 903 (Content-Type). The mediation application 420 transmits e.g. a command described in a body of the HTTP response message, in the step S505 shown in FIG. 5, depending on the destination 901. The command to be transmitted is, although not shown, an XML message according to SOAP (simple object access protocol), which causes the service provider section 440 to execute a job, such as scan, print, and file transfer.

The time-out period 902 is e.g. a time-out period for communication of the mediation apparatus 103 with the service provider section 440, and is indicated by seconds. The mediation apparatus 103 counts time when communicating with the service provider section 440. When the time designated by the time-out period 902 has elapsed, the mediation apparatus 103 stops the communication, and sends a time-out error response to the Web application 410. Referring again to the flowchart in FIG. 6, when the mediation application 420 receives the HTTP response message from the Web application 410 in the step S602, the mediation application 420 determines whether or not a field of the content type (Content-Type) 903 of the header included in the HTTP response message describes application/vnd.canon.webservice (step S603).

If it is determined that the field of the content type (Content-Type) 903 does not indicate application/vnd.canon.webservice (NO to the step S603), the mediation application 420 transmits the HTTP response message to the Web browser 430 according to the result of determination (step S604), followed by terminating the present process.

On the other hand, if it is determined that the field of the content type (Content-Type) 903 describes an attribute of requesting call-up of the Web service, i.e. application/vnd.canon.webservice (YES to the step S603), the process proceeds to a step S605. In the step S605, the mediation application 420 sends a SOAP command contained in the HTTP response message to the service provider section 440 to call up the Web service (step S605). In general, in a client/server system, an HTTP response message to an HTTP request message is sent back to a client which issued the request (the Web browser 430 in the present example). However, when the process proceeds to the step S605, the response to the HTTP request message which has been sent by the Web browser 430 is sent not to the Web browser 430 but to the service provider section 440. Therefore, at this time point, the Web browser 430 is in a state waiting for a response to the HTTP request message.

When the mediation apparatus 103 (mediation application 420) sends the SOAP command to the service provider section 440 of the MFP 101 in the step S605, the job generator 442 of the service provider section 440 generates a job (a scan job, a transfer job, or the like) according to the received command, and causes a processing unit, associated with the job, of the MFP 101 to execute image processing as a Web service. For example, if the received command is a scan request, an original is read by the image reading function to generate image data. Further, if the received command is a file transfer request, the image data thus generated is transferred to a designated destination by the image transfer function.

FIG. 7 is a continuation of FIG. 6. It is assumed here that after the service provider section 440 has transmitted the processing result to the Web application 410 via the mediation application 420, the Web application 410 sends a processing request to the mediation apparatus 103 again. In the illustrated example, the field of the content type (Content-Type) 903 of a header of an HTTP response message to be sent back to the service provider section 440 is analyzed, and it is determined according to the result of the analysis to which of the service provider section 440 or the Web browser 430 the HTTP response message is to be transferred.

As described hereinabove, if in the step S605, the mediation apparatus 103 (mediation application 430) calls up a Web service and as a result, the job is executed by the service provider section 440, the mediation application 420 acquires, thereafter, the processing result (e.g. job processing result) from the service provider section 440 (step S701). Then, the mediation application 420 transmits an HTTP request message including the acquired processing result to the Web application 410 (step S702).

Subsequently, the mediation application 420 receives an HTTP response message including an instruction concerning processing from the server 102 (Web application 410) again (step S703). The mediation application 420 analyzes the field of the content type (Content-Type) 903 of the header of the HTTP response message, similarly to the step S603. If the content type (Content-Type) 903 indicates the attribute of requesting the Web service request to the service provider section 440 again (application/vnd.canon.webservice) (YES to the step S704), the process proceeds to a step S706. In the step S706, the mediation application 420 sends a SOAP command contained in the HTTP request message received in the step S703 to the service provider section 440 again to call up a Web service. On the other hand, if the content type (Content-Type) 903 does not indicate the attribute of requesting the Web service (NO to the step S704), it is judged that the instruction from the Web application 410 is not an instruction to the service provider section 440 but an instruction to the Web browser 430, so that the process proceeds to a step S705. In the step S705, the mediation application 420 transfers the HTTP response message to the Web browser 430, followed by terminating the present process.

As described above with reference to FIGS. 6 and 7, the mediation application 420 determines whether the contents of the body of the HTTP response message describe a processing request to the service provider section 440 or the HTML content to be displayed on the Web browser 430, according to the content type 903. More specifically, the above determination is performed by analyzing whether or not the attribute indicative of a Web service request (application/vnd.canon.webservice) exists in the header of the HTTP response message. Then, if the attribute indicative of a Web service request exists, a command indicative of the Web service request contained in the HTTP response message is sent to the service provider section 440.

In the present embodiment, if the attribute indicative of a Web service request is contained in the HTTP response message as a response to the HTTP request message sent by the Web browser 430, the message is not received by the Web browser 430, but is forwarded to the service provider section 440 by the mediation application 420. Therefore, it is not required to extend a particular function of the Web browser.

As described above, according to the present embodiment, even when an information processing apparatus, such as an MFP, undergoes modification of an interface provided therein, such as extension of a function, it is not necessary to modify modules (particularly the Web browser) provided in the MFP. That is, even when a service provider section of an information processing apparatus, which controls job processing, is extended, it is possible to flexibly cope with the extension. Further, without integrating an application for call-up in the information processing apparatus, a mediation apparatus is disposed separately from a server, and a mediation application which operates on the mediation apparatus performs a call-up operation. Therefore, it is possible to perform system expansion, causing a user to take less trouble.

Figure 8:
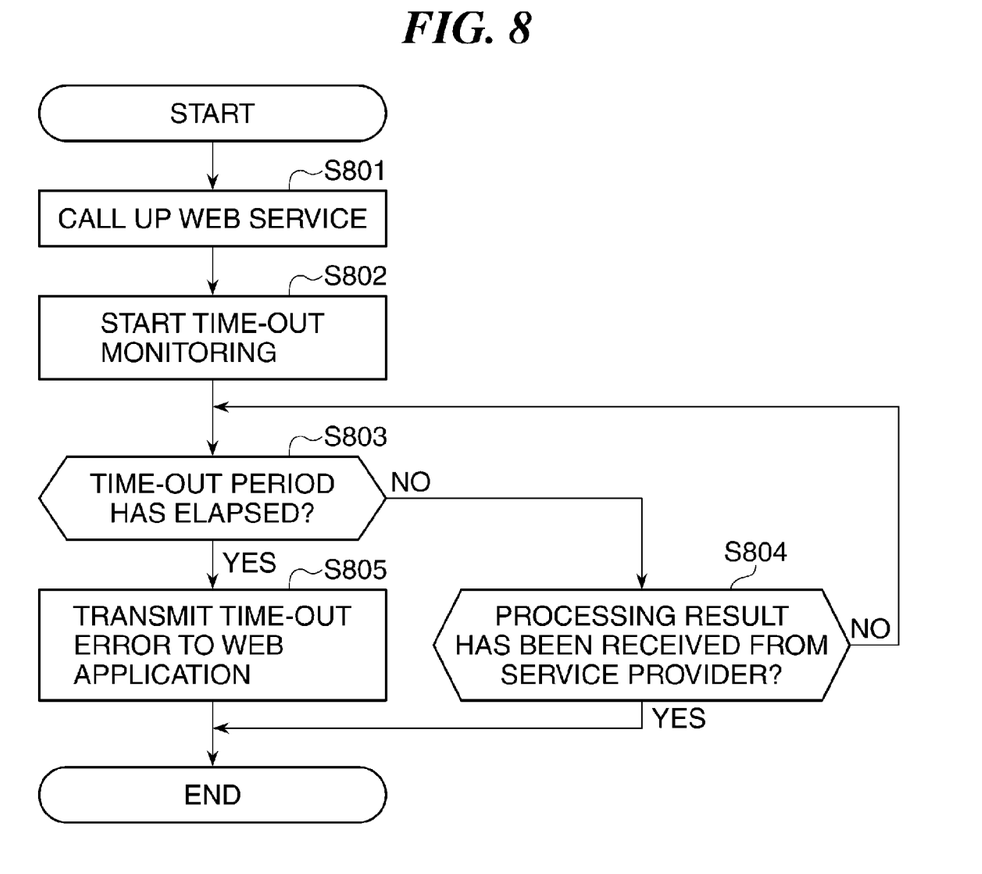
FIG. 8 is a flowchart useful in explaining a time-out process executed when the mediation apparatus calls up a Web service of the MFP.

FIG. 8 is a flowchart useful in explaining a time-out process executed when the mediation application 420 shown in FIG. 4 calls up a Web service of the service provider section 440.

As described herein above with reference to FIG. 6, while referring to FIGS. 4 and 7, if the content type (Content-Type) 903 is application/vnd.canon.webservice, the mediation application 420 calls up a Web service, described in the HTTP response message, of the service provider section 440. That is, the mediation application 420 calls up a Web service as an interface of the service provider section 440 (step S801). Then, the mediation application 420 starts to monitor a predetermined time-out period after calling up the Web service (step S802).

The mediation application 420 checks whether or not the time-out period has elapsed (step S803). If the time-out period has not elapsed (NO to the step S803), the mediation application 420 checks whether or not the mediation application 420 has received a processing result from the service provider section 440 (step S804).

If the mediation application 420 has not received a processing result from the service provider section 440 (NO to the step S804), the mediation application 420 returns to the step S803. On the other hand, if the mediation application 420 has received a processing result from the service provider section 440 (YES to the step S804), the mediation application 420 terminates the present process.

If the time-out period has elapsed (YES to the step S803), the mediation application 420 judges that a time-out error has occurred, and transmits a time-out error response to the Web application 410 (step S805). Then, the mediation application 420 terminates the present process.

As is clear from the above description, in FIG. 4, the Web browser 430 functions as a display control unit, and the service provider section 440 functions as a job processing unit. Further, the mediation application 420 functions as a transmission and reception unit, a determination unit, and a transmission unit. The mediation application 420 further functions as a count unit and a notification unit.

The present invention has been described heretofore based on the embodiments thereof. However, the present invention is not limited to these embodiments, but it is to be understood that the invention includes various forms within the scope of the gist of the present invention.

For example, a control method based on the functions of the above-described embodiments may be caused to be executed by a relay device (mediation apparatus). Further, a control program implement the functions of the above-described embodiments may be caused to be executed by a computer provided in the relay device. The control program is stored e.g. in a computer-readable storage medium.

The control method and program include at least a transmission/reception step, a determination step, and a transmission step.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-112448, filed May 19, 2011 which is hereby incorporated by reference herein in its entirety.

What is claimed is:

1. A relay device that communicates with an external apparatus via a network, and mediates between an information processing apparatus which executes job processing according to an operation on an operation screen provided by the external apparatus and the external apparatus, the information processing apparatus including a display control unit configured to display the operation screen on a display section, and a job processing unit configured to execute the job processing, the relay device comprising:
    a transmission and reception unit configured to receive a request corresponding to an operation on the operation screen from the information processing apparatus, transmit the received request to the external apparatus, and receive a response to the request from the external apparatus;
    a determination unit configured to determine to which of the display control unit and the job processing unit the response is to be transmitted according to a content of the response; and
    a transmission unit configured to transmit the response to one of the display control unit and the job processing unit according to a result of the determination by said determination unit.

2. The relay device according to claim 1, wherein when a result of the determination by said determination unit indicates that the response is to be transmitted to the job processing unit, said transmission and reception unit transmits a notification indicative of a result of the job processing executed by the job processing unit to the external apparatus.

3. The relay device according to claim 2, further comprising:
    a count unit configured to start counting time when the response is transmitted to the job processing unit; and
    a notification unit configured to notify the external apparatus of a time-out error when a time counted by said count unit has passed a predetermined time-out period.

4. The relay device according to claim 1, wherein the response is a response according to an HTTP protocol, and
    wherein said determination unit determines whether to transmit the response to both or one of the display control unit and the job processing unit according to a content type field in a header of the response.

5. The relay device according to claim 1, wherein the response includes a command for operating the job processing unit.

6. The relay device according to claim 5, wherein the command is written in XML.

7. A network system including a relay device that communicates with an external apparatus via a network, and an information processing apparatus that communicates with the relay device,
    wherein the information processing apparatus comprises:
        a display control unit configured to display an operation screen on a display section; and
        a job processing unit configured to execute job processing, and
    wherein the relay device comprises:
        a transmission and reception unit configured to receive a request corresponding to an operation on the operation screen from the information processing apparatus, transmit the received request to the external apparatus, and receive a response to the request from the external apparatus;
        a determination unit configured to determine to which of the display control unit and the job processing unit the response is to be transmitted according to a content of the response; and
        a transmission unit configured to transmit the response to one of the display control unit and the job processing unit according to a result of the determination by said determination unit.

8. The network system according to claim 7, wherein the job processing executed by said job processing unit is a scan job for scanning an original to generate image data or a transmission job for transmitting the image data to a designated destination.

9. The network system according to claim 8, wherein said job processing unit executes the scan job or the transmission job according to an operation on the operation screen displayed on the display section.

10. A method of controlling a relay device that communicates with an external apparatus via a network, and mediates between an information processing apparatus which executes job processing according to an operation on an operation screen provided by the external apparatus and the external apparatus, the information processing apparatus including a display control unit configured to display the operation screen on a display section, and a job processing unit configured to execute the job processing, the method comprising:
    receiving a request corresponding to an operation on the operation screen from the information processing apparatus, transmitting the received request to the external apparatus, and receiving a response to the request from the external apparatus;
    determining to which of the display control unit and the job processing unit the response is to be transmitted according to a content of the response; and
    transmitting the response to one of the display control unit and the job processing unit according to a result of the determination by said determining.

11. A network system including a proxy server and an image forming apparatus, the system comprising:
    wherein the image forming apparatus comprises:
        a display control unit configured to display an operation screen;
        a job processing unit configured to execute job processing, and
    wherein the proxy server comprises:
        a first receiving unit configured to receive, from the display control unit, a request message containing information which is input via the operation screen;
        a first transmitting unit configured to transmit the request message to a web server over the internet;
        a second receiving unit configured to receive, from the web server, a response message corresponding to the request message;
        a determination unit configured to determine to which of the display control unit and the job processing unit the response message is to be transmitted according to a content of the response message; and
        a second transmitting unit configured to transmit the response message to one of the display control unit and the job processing unit, according to a result of the determination by said determination unit.

12. The network system according to claim 11, wherein the job processing executed by said job processing unit is a scan job for scanning an original to generate image data or a transmission job for transmitting the image data to a designated destination.

13. The network system according to claim 12, wherein said job processing unit executes the scan job or the transmission job according to an operation on the operation screen displayed on the display section.

14. The network system according to claim 11,
wherein the request message is an HTTP request message,
wherein the response message is an HTTP response message, and
wherein said second transmitting unit is configured to transmit a SOAP command contained in the HTTP response message to the job processing unit so as to call a Web service.

15. The network system according to claim 11, wherein the display control unit is configured to display the operation screen using a web browser.

16. The network system according to claim 11, wherein when a result of the determination by said determination unit indicates that the response is to be transmitted to the job processing unit, said first transmitting unit transmits a notification indicative of a result of the job processing to the web server.

17. The network system according to claim 11, wherein said determination unit determine to which of the display control unit and the job processing unit the response message is to be transmitted according to a content type field in a header of the response.

18. The network system according to claim 11,
wherein the proxy server further comprises:
a count unit configured to start counting time when the response message is transmitted to the job processing unit; and
a notification unit configured to notify the external apparatus of a time-out error when a time counted by said count unit has passed a predetermined time-out period.

19. A method of controlling a network system including a proxy server and an image forming apparatus, the method comprising:
displaying an operation screen with a display control unit of the image forming apparatus;
executing job processing with a job processing unit of the image forming apparatus, and
wherein the proxy server comprises:
receiving, with a first receiving unit configured of the proxy server, from the display control unit, a request message containing information which is input via the operation screen;
transmitting, with a first transmitting unit of the proxy server, the request message to a web server over the internet;
receiving, with a second receiving unit of the proxy server, from the web server, a response message corresponding to the request message;
determining, with a determination unit of the proxy server, to which of the display control unit and the job processing unit the response message is to be transmitted according to a content of the response message; and
transmitting, with a second transmitting unit of the proxy server, the response message to one of the display control unit and the job processing unit, according to a result of the determination by said determination unit.

* * * * *